United States Patent [19]

Maksimovic et al.

[11] Patent Number: 5,383,109

[45] Date of Patent: Jan. 17, 1995

[54] HIGH POWER FACTOR BOOST RECTIFIER APPARATUS

[75] Inventors: Dragan Maksimovic; Robert W. Erickson, both of Boulder, Colo.

[73] Assignee: University of Colorado, Boulder, Colo.

[21] Appl. No.: 165,404

[22] Filed: Dec. 10, 1993

[51] Int. Cl.6 .......................... G05F 1/10; H02M 7/04
[52] U.S. Cl. ..................... 323/222; 363/143
[58] Field of Search ............... 323/222, 259, 282, 290, 323/344; 363/34, 37, 59–62, 101, 142, 143

[56] References Cited

U.S. PATENT DOCUMENTS

| | | | |
|---|---|---|---|
| 3,851,182 | 11/1974 | Wallace | 307/23 |
| 4,268,899 | 5/1981 | Rokas | 363/21 |
| 4,389,702 | 6/1983 | Clemente et al. | 363/21 |
| 4,600,982 | 7/1986 | Graham | 363/61 |
| 4,654,774 | 3/1987 | Lemmers | 363/48 |
| 4,730,243 | 3/1988 | Glennon | 363/44 |
| 4,745,352 | 5/1988 | McGuire | 323/344 |
| 4,780,805 | 10/1988 | Chewuk et al. | 363/142 |
| 4,801,859 | 1/1989 | Dishner | 323/222 |
| 4,831,508 | 5/1989 | Hunter | 363/44 |
| 4,837,672 | 6/1989 | Donze | 363/143 |
| 4,864,488 | 9/1989 | Bulmahn et al. | 363/143 |
| 4,884,180 | 11/1989 | Hoffmann | 363/101 |
| 4,933,832 | 6/1990 | Schneider et al. | 363/143 |
| 4,937,731 | 6/1990 | Konopka | 363/143 |
| 4,970,451 | 11/1990 | Suomalainen | 323/222 |
| 5,119,283 | 6/1992 | Steigerwald et al. | 363/101 |
| 5,138,547 | 8/1992 | Swoboda | 363/143 |
| 5,200,887 | 4/1993 | Ioroi et al. | 363/143 |
| 5,257,170 | 10/1993 | Spruijt | 323/222 |

OTHER PUBLICATIONS

R. Redl and L. Balogh, "*RMS, DC, Peak and Harmonic Currents in High-Frequency Power-Factor Correctors with Capacitive Energy Storage*", IEEE 1992, pp. 533–540.

John C. Salmon, "*Circuit Topologies for Single-Phase Voltage-Doubler Boost Rectifiers*", IEEE 1992, pp. 549–556.

Advertisement for "*Lambda's P Series*", Electronic Design, Jun. 10, 1993.

Primary Examiner—Steven L. Stephan
Assistant Examiner—Matthew Nguyen
Attorney, Agent, or Firm—Greenlee and Winner

[57] ABSTRACT

A power supply for providing a single level dc output voltage, with input power factor correction, from a wide range of ac input voltages commonly available worldwide. The power supply rectifier circuit can be configured as a full wave bridge for high line voltage inputs and as a voltage doubler for low voltage inputs. Output voltage regulation and power factor correction are accomplished by a high frequency boost circuit having two inductors connected in parallel for the low input voltage configuration and in series for the high input voltage configuration. The high frequency switching semiconductor components are connected in a series circuit which limits their voltage requirement to one-half the output voltage.

17 Claims, 3 Drawing Sheets

HIGH POWER FACTOR BOOST RECTIFIER APPARATUS

This invention relates to power supplies for electronic equipment and more particularly to circuits for utilizing the wide range of ac power line voltages found in different countries throughout the world and to circuits for ac line power factor correction.

BACKGROUND OF THE INVENTION

Various types of electronic equipment including digital computers are frequently used in worldwide environments where readily available input power is different in different countries. For example, in the United States power at 115 volts is readily available and in Europe 230 volts is common. Such equipment must convert the readily available ac power to the constant voltage dc power required by electronic circuits. That function is provided by a rectifier apparatus, often called a power supply, connected between the ac power line and the dc power distribution system supplying the electronic circuits.

To accommodate a factor of two in the range of possible ac input voltage levels and still provide essentially the same dc output voltage level, it has become increasingly common in power supply design to provide a full-wave bridge rectifier for a high voltage input and a voltage-doubler rectifier for a low voltage input, the appropriate configuration selected by a switch. The selected rectifier is often followed by a high-frequency dc to dc converter for providing the desired output voltage levels from input voltage ranges exceeding the aforementioned factor of two.

Another frequently used method of accommodating wide ranges of input voltage is the boost rectifier where energy is stored in an inductor when a switch is closed and the stored energy is transferred through a diode to a capacitor when the switch is opened. By operating the switch at a high frequency relative to the line voltage frequency and with a programmed duty cycle, the dc output voltage supplied to a load can be regulated and in addition the ac line power factor can be corrected as required.

However, in commonly used high frequency boost rectifiers, the inductor has conflicting requirements. First, it must have an inductance value sufficiently large for the highest line voltage when the current requirement is low. Second, it must have current capacity sufficient for the lowest line voltage when the inductance requirement is low. These conflicting requirements result in an inductor that is more expensive and physically larger than that needed for either the high or low line voltage case alone.

It is an object of the invention to provide a circuit configuration that reduces the peak current requirements on inductors used in boost rectifiers.

Also, in conventional boost rectifiers, the output circuit diodes and transistors, which are high speed switching devices, must withstand voltages at least as high as the highest value of the peak ac input voltage. As a consequence, because high voltage devices tend to be slower and to have higher resistance than otherwise equivalent low voltage devices, semiconductor costs or power dissipation (or both) tend to be high.

It is an additional object of the invention to provide an output circuit configuration in which the semiconductor switching devices are exposed to voltages much lower than the output voltage resulting in lower costs and improved performance and reliability.

SUMMARY OF THE INVENTION

Briefly stated, the invention is a high-frequency boost rectifier which provides an output circuit in which the output voltage is divided, approximately equally, between two series-connected circuits each comprising a switching transistor connected through a switching diode to an output filter capacitor. The invention also provides for dividing a single inductor into two smaller inductors with a switching device for connecting the two inductors in parallel for a low input voltage case and in series for a high input voltage case. The switching device is also used to configure the rectifier circuit as a full wave bridge for the high input voltage case and as a voltage doubler for the low input voltage case.

Additional embodiments of the invention have the two inductors wound on a common magnetic core and include various configurations in which the inductors carry either ac current or dc current, the dc versions permitting the use of a permanent magnet to provide an opposing magnetic field.

BRIEF DESCRIPTION OF THE DRAWINGS

The above-mentioned and other features and objects of the invention and the manner of attaining them will become more apparent and the invention itself will best be understood by reference to the following description of embodiments of the invention taken in conjunction with the accompanying drawing, a brief description of which follows.

DETAILED DESCRIPTION

Figure 1:
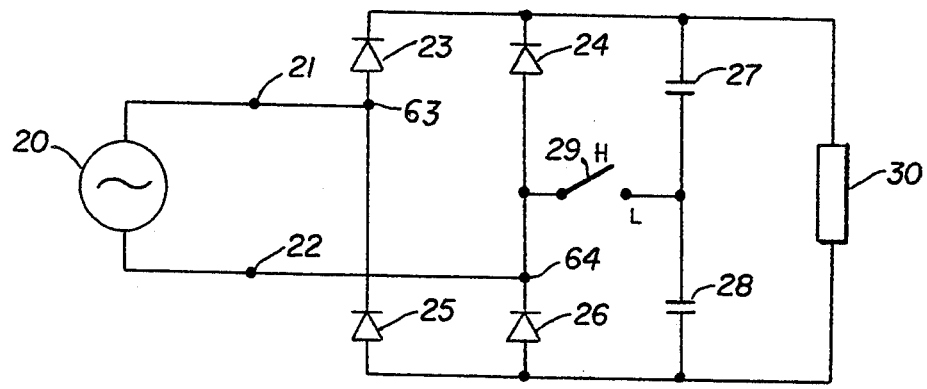
FIG. 1 is a schematic diagram of a peak detecting universal input rectifier commonly found in the prior art.

When reference is made to the drawing, like numerals will indicate like parts and structural features in the various figures.

In the following descriptions of circuit operation, small voltages such as the forward voltage drops across diodes are ignored for simplicity. However, it should be obvious to those skilled in the art that such circuit properties exist and must be considered in design and analysis of working hardware.

FIG. 1 shows an ac voltage generator 20, representing the ac power line, connected to input terminals 21 and 22 which are in turn connected to input terminals 63 and 64 of a full wave bridge rectifier comprising diodes 23, 24, 25, and 26. The output of the bridge rectifier is connected across series connected filter capacitors 27 and 28 and across the output load 30. A switch 29 provides a means of connecting one of the ac input terminals to the junction of capacitors 27 and 28.

In operation with a high line voltage input, for example 230 volts, switch 29 is open. On the positive half cycle of the ac line voltage, terminal 21 is more positive than terminal 22, and when the line voltage exceeds the sum of the voltages across capacitors 27 and 28, current flows from the voltage generator 20 through diode 23, capacitors 27 and 28 (neglecting the current through load 30 for the moment), diode 26, and back to the generator thereby charging the capacitors to the peak of the line voltage. On the negative half cycle, the current path is from the generator through diode 24, capacitors 27 and 28, diode 25, and back to the generator thereby again charging the capacitors to the peak of the line voltage. In the time intervals when the magnitude of the line voltage is less than the capacitor voltage, the diodes are not conducting and the load current is supplied by the capacitors.

In operation with a low line voltage input, for example 115 volts, switch 29 is closed. On the positive half cycle, the current path is from the generator 20 through diode 23, capacitor 27, switch 29, and back to the generator thereby charging capacitor 27 to the peak of the line voltage. On the negative half cycle, the current path is from the generator through switch 29, capacitor 28, diode 25, and back to the generator thereby again charging capacitor 28 to the peak of the line voltage.

In both the low and high line voltage cases, if the high line voltage is approximately double the low line voltage, the output voltage is essentially the same. However, the rectifier of FIG. 1 has no means of compensating for variations in input voltage or output current.

Capacitance values chosen for capacitors 27 and 28 must be large enough to ensure that the output voltage decay due to load current, during the time intervals when the diodes are not conducting, is negligible. This results in very short diode conduction intervals and very high line current pulses during the peaks of the line voltage (this is the justification for neglecting the load current during the previous descriptions of circuit operation). Such large short-duration current pulses have a low power factor and a high harmonic content. Even at low power levels these properties can exceed the limits in proposed regulations for equipment connected to public power systems.

Figure 2:
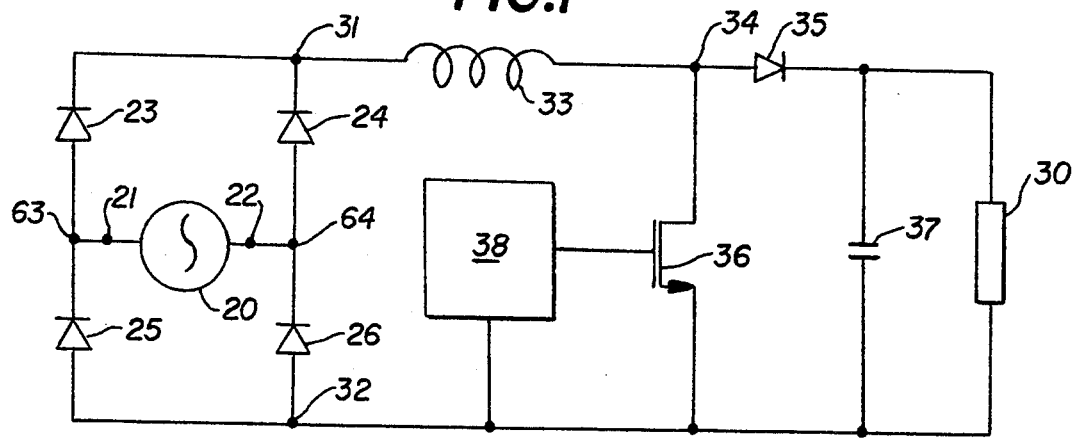
FIG. 2 is a schematic diagram of a conventional high power factor boost rectifier commonly found in the prior art.

FIG. 2 shows a typical high power factor boost rectifier used to overcome some of the problems of the peak detection rectifier in FIG. 1. As in FIG. 1, the voltage generator 20 is connected to the input terminals 63 and 64 of a full wave bridge rectifier including rectifier diodes 23, 24, 25 and 26 with positive output terminal 31 and negative (reference) output terminal 32. Inductor 33 is connected between output terminal 31 and the junction 34 of the anode of switching diode 35 and the drain of switching transistor 36. The cathode of diode 35 is connected to the junction of one lead of load 30 and one lead of capacitor 37. Reference output 32 is connected to the junction of the source of transistor 36 and the remaining leads of capacitor 37 and load 30. A control circuit 38 is connected between the gate and source of transistor 36 to provide output voltage regulation and power factor control.

In operation, the voltage at terminal 31, relative to reference terminal 32, is a full wave rectified version of the line voltage input. Under control of circuit 38, transistor 36 switches on and conducts as the current through inductor 33 rises at a rate determined by the voltage across the inductor. After a time interval determined by circuit 38, transistor 36 switches off resulting in the voltage across it rising to the level necessary to maintain the current level in the inductor. This voltage is determined by the voltage across capacitor 37 (neglecting the forward voltage drop of diode 35). The current path from inductor 33 then includes diode 35, the parallel combination of capacitor 37 and load 30, the bridge rectifiers and the generator 20. The current decays at a rate determined by the voltage across the inductor. It continues to decay until the energy stored in inductor 33 is transferred to capacitor 37 or until transistor 36 turns on again.

It may be observed that although the load 30 is connected across the output capacitor and shares the inductor current, for simplicity in this and subsequent discussions the capacitor current is treated as the superposition of the charging current and the load current. By assuming steady state operation with essentially constant output voltage and a constant average load current equal to the average charging current, attention can be focused on the charging current only as relevant to this invention. However, it should be obvious to those skilled in the art that load current characteristics must be considered in the design of practical circuits.

By switching transistor 36 at a frequency many times higher than the power line frequency and controlling its duty cycle, algorithms contained in control circuit 38 can control both the waveshape of the current drawn from the power line and the energy transferred to, and hence the voltage across, capacitor 37. By this process of first storing energy in an inductor and then transferring it to a capacitor, the capacitor can be charged to a voltage much higher than the peak of the rectified line voltage. The boost rectifier can therefore provide both voltage multiplication and regulation as well as power factor control.

The steady state dc output voltage of a boost rectifier circuit without conduction of the transistors and with no load current, hereinafter referred to as the unboosted and unloaded output voltage, is equal to the magnitude of the peak (or peak to peak in the case of a voltage doubler) of the ac line voltage.

Figure 3:
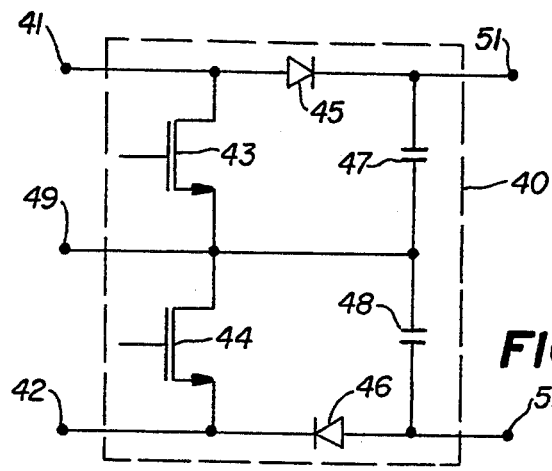
FIG. 3 is a schematic diagram of the output circuit common to all embodiments of the present invention.

FIG. 3 shows, as part of the present invention, an improvement over the output circuit of FIG. 2. The components of FIG. 2 including switching diode 35, transistor 36, and capacitor 37 are replaced by the output circuit 40 of FIG. 3. Output circuit 40 includes transistors 43 and 44 connected in series across input terminals 41 and 42. The anode of a switching diode 45 is connected to terminal 41 and its cathode to output terminal 51. The cathode of another switching diode 46 is connected to terminal 42 and its anode to output terminal 52. Two capacitors 47 and 48 are connected in series between output terminals 51 and 52. The junction of transistors 43 and 44 is connected to the junction of capacitors 47 and 48 and to another input terminal 49. The load is to be connected across output terminals 51 and 52.

An important advantage of this output circuit configuration is that it allows the output voltage, between terminals 51 and 52, to be divided between each pair of output components, transistors 43 and 44, switching diodes 45 and 46, and capacitors 47 and 48 thereby reducing their voltage requirements by about one-half. A second value of this circuit is that in the low input voltage, high current case, each transistor and its associated switching diode conduct only on alternate half cycles of the line voltage. Since the on-resistance of an MOS transistor approximately triples for a doubling of its voltage rating, reducing the voltage requirement by a factor of two reduces the peak power dissipation per transistor by a factor of three for the same current rating. Also, since each transistor is conducting only half the time in the high current (low input voltage) mode, the maximum average power dissipation is reduced by a factor of six per transistor. Obviously these advantages can be realized in various ways including, for example, the use of smaller semiconductor devices at the same power dissipation for cost reduction.

Figure 4:
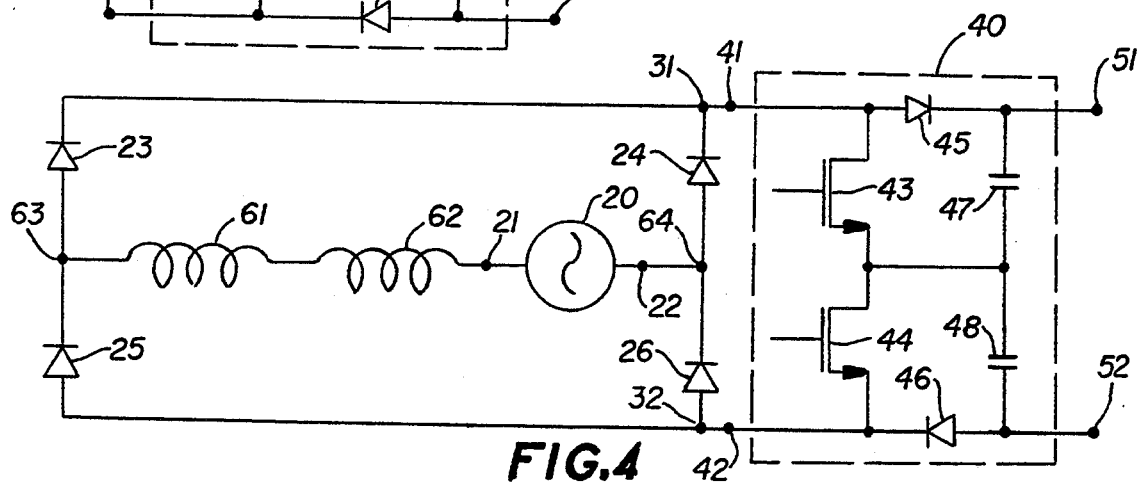
FIG. 4 shows a simplified functional schematic of the present invention configured for a high line voltage input.

FIG. 4 is a simplified schematic showing only the functional aspects of the present invention when configured for a high line voltage input. An ac voltage source 20 representing the power line is connected to input terminals 21 and 22. Terminals 21 and 22 are connected to terminals 63 and 64 of a full wave bridge rectifier including rectifier diodes 23, 24, 25, and 26 through series inductors 61 and 62. Rectifier output terminals 31 and 32 are connected to input terminals 41 and 42 of the output circuit 40 previously described.

On the positive half cycle of the line voltage, terminal 21 is positive with respect to terminal 22. When transistors 43 and 44 are conducting, the current path is from terminal 21, through inductors 62 and 61, diode 23, transistors 43 and 44, and diode 26, to terminal 22. When transistors 43 and 44 turn off, the current path is from terminal 21, through inductors 62 and 61, diode 23, diode 45, series capacitors 47 and 48, diode 46, diode 26, to terminal 22.

On the negative half cycle of the line voltage, terminal 21 is negative with respect to terminal 22. When transistors 43 and 44 are conducting, the current path is from terminal 22, through diode 24, transistors 43 and 44, diode 25, inductors 61 and 62, to terminal 21. When transistors 43 and 44 turn off, the current path is from terminal 22, through diode 24, diode 45, series capacitors 47 and 48, diode 46, diode 25, inductors 61 and 62, to terminal 21. Transistors 43 and 44 are switched simultaneously, at a frequency many times higher than the line frequency, by a control circuit (not shown) performing the boost, regulation, and power factor functions as described for control circuit 38 in FIG. 2.

Figure 5:
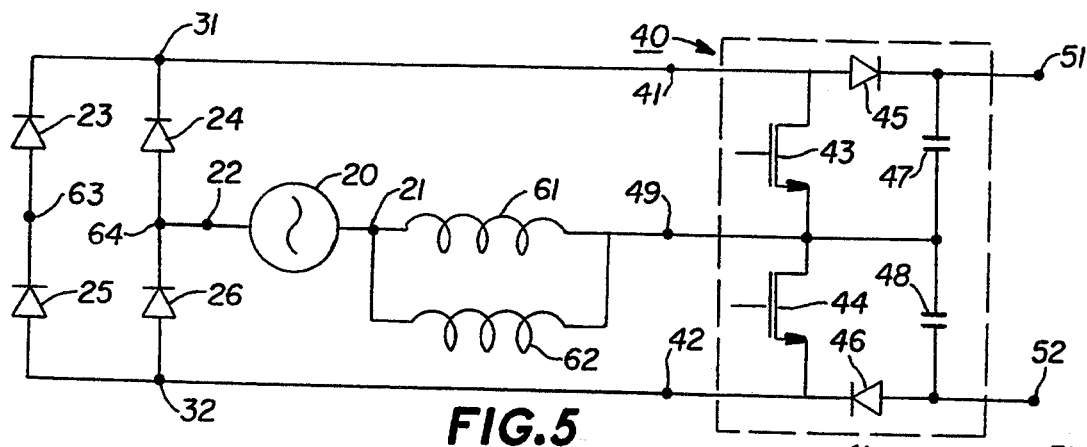
FIG. 5 shows a simplified functional schematic of the present invention configured for a low line voltage input.

FIG. 5 is a simplified schematic showing only the functional aspects of the present invention when configured for a low line voltage input. An ac voltage source 20 representing the power line is connected to input terminals 21 and 22. Terminal 21 is connected through parallel inductors 61 and 62 to terminal 49 of output circuit 40. Terminal 22 is connected to one input terminal 64 of a full wave bridge rectifier including rectifier diodes 23, 24, 25, and 26. The other input terminal 63 of the bridge rectifier is unused. Bridge rectifier output terminals 31 and 32 are connected to input terminals 41 and 42 of the output circuit 40.

On the positive half cycle of the line voltage, terminal 21 is positive with respect to terminal 22. When transistor 44 is conducting, the current path is from terminal 21, through parallel inductors 61 and 62, transistor 44 and diode 26 to terminal 22. When transistor 44 turns off, the current path is from terminal 21, through parallel inductors 61 and 62, capacitor 48, diode 46, and diode 26 to terminal 22.

On the negative half cycle of the line voltage, terminal 22 is positive with respect to terminal 21. When transistor 43 is conducting, the current path is from terminal 22, through diode 24, transistor 43, and parallel inductors 61 and 62 to terminal 21. When transistor 43 turns off, the current path is from terminal 22, through diode 24, diode 45, capacitor 47, and parallel inductors 61 and 62, to terminal 21.

Transistors 43 and 44 are switched at a frequency many times higher than the line frequency, either simultaneously or on alternate half cycles of the line voltage, by a control circuit (not shown) performing the boost, regulation, and power factor functions as described above with reference to FIG. 2.

Figure 6:
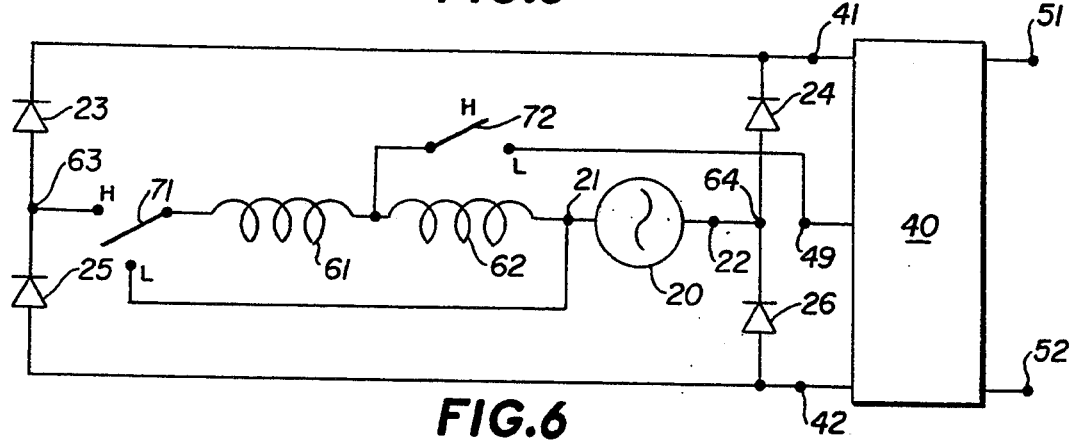
FIG. 6 is a schematic diagram of one embodiment of the universal input, high power factor boost rectifier comprising the present invention.

FIG. 6 shows one embodiment of the present invention combining the circuits of FIGS. 4 and 5 into one circuit with switches 71 and 72 for selecting the low or high line voltage configuration.

When in the H position, switch 71 connects inductors 61 and 62 in series with the voltage source 20 across the bridge rectifier inputs 63 and 64 while switch 72 is open. This is the high line configuration illustrated in FIG. 4.

When in the L position, switch 71 disconnects inductor 61 from input terminal 63 of the bridge rectifier and connects it, in parallel with inductor 62, to input terminal 21. Switch 72, in the L position, connects the fixed junction of inductors 61 and 62 to output circuit terminal 49. This is the low line configuration illustrated in FIG. 5.

Figure 7:
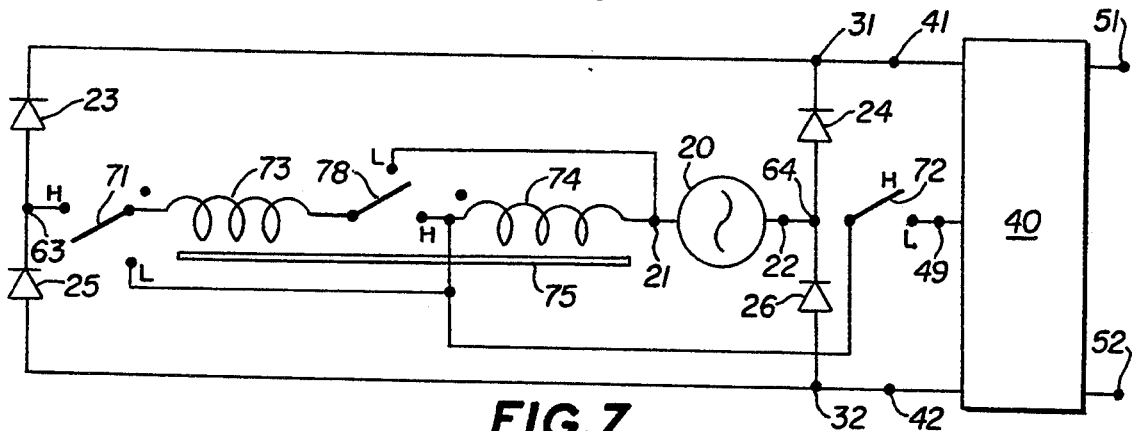
FIG. 7 is a schematic diagram of an embodiment of the present invention using inductors with a common magnetic core.

FIG. 7 shows the embodiment of FIG. 6 after replacing inductors 61 and 62 with inductors 73 and 74 having a common magnetic core 75 and adding switch 78 to permit cumulative connections of the windings.

In the H position, switches 71 and 78 place inductors 73 and 74 in a cumulative series connection, and in series with the source 20, across the input terminals 63 and 64 of the bridge rectifier. Switch 72 remains open.

In the L position, switch 71 disconnects inductor 73 from terminal 63 and, along with switch 78, connects it in a cumulative parallel relationship with inductor 74. Switch 72 connects the parallel inductors, in series with source 20, between rectifier input terminal 64 and output circuit terminal 49.

Figure 8:
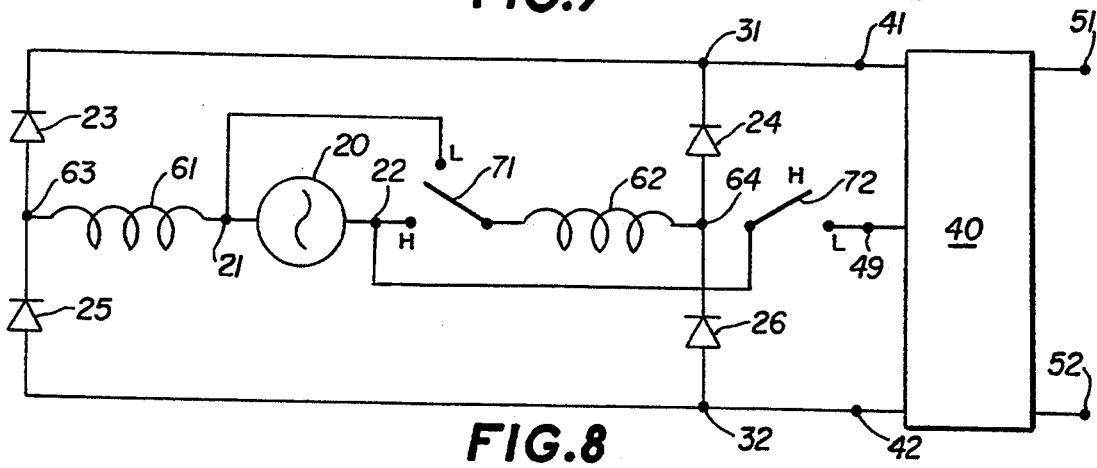
FIG. 8 is a schematic of an embodiment of the present invention in which the rectifier diodes share the input current when the rectifier is configured for low line voltage input.

FIG. 8 shows the embodiment of FIG. 6 modified to utilize all the diodes in the full wave bridge rectifier when the circuit is configured for low line input.

In the high line configuration, the circuit remains functionally identical to that of FIG. 6.

When in the low line configuration, switch 71 disconnects inductor 62 from input terminal 22 and connects it to input terminal 21 while switch 72 connects input terminal 22 to output circuit terminal 49. In the resulting circuit, terminal 21 is connected through inductor 61 to input terminal 63 and through inductor 62 to input terminal 64 of the full wave bridge rectifier. Bridge rectifier output terminals 31 and 32 are connected to input terminals 41 and 42 of the output circuit 40.

On the positive half cycle of the line voltage, terminal 21 is positive with respect to terminal 22. When transistor 43 is conducting, the current path is from terminal 21, through the parallel paths of inductor 61 in series with diode 23 and inductor 62 in series with diode 24, and through transistor 43, to terminal 22. When transistor 43 turns off, the current path is from terminal 21, through the parallel paths of inductor 61 in series with diode 23 and inductor 62 in series with diode 24, diode 45, and capacitor 47 to terminal 22.

On the negative half cycle of the line voltage, terminal 22 is positive with respect to terminal 21. When transistor 44 is conducting, the current path is from terminal 22, through transistor 44, through the parallel paths of diode 25 in series with inductor 61 and diode 26 in series with inductor 62, to terminal 21. When transistor 44 turns off, the current path is from terminal 22, through capacitor 48, diode 46, and the parallel paths of diode 25 in series with inductor 61 and diode 26 in series with inductor 62, to terminal 21.

In this version of the apparatus, each rectifier diode carries only approximately half the input current when in the low line configuration.

Figure 9:
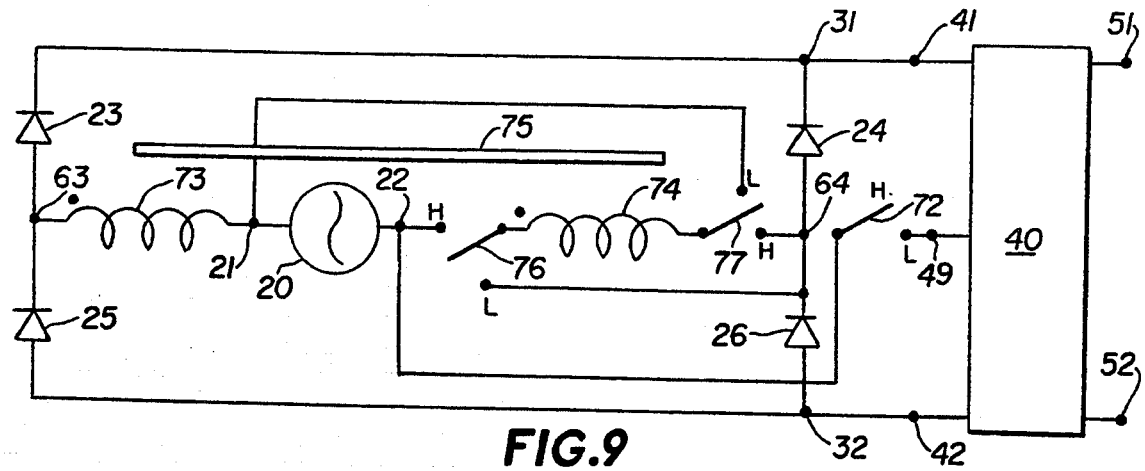
FIG. 9 is a schematic diagram of an embodiment of the present invention using inductors with a common magnetic core in which the rectifier diodes share the input current when the rectifier is configured for low line voltage input.

FIG. 9 shows the embodiment of FIG. 8 after replacing inductors 61 and 62 with inductors 73 and 74 having a common magnetic core 75 and after replacing switch 71 with switches 76 and 77.

In the H position, switches 76 and 77 place inductors 73 and 74 in a cumulative series connection and in series with the source 20 across the input terminals 63 and 64 of the bridge rectifier. Switch 72 remains open.

In the L position, switches 76 and 77 connect inductor 74 between input terminal 21 and bridge rectifier terminal 64 in a cumulative parallel relationship with inductor 73. Switch 72 connects input terminal 22 to output circuit terminal 49.

Figure 10:
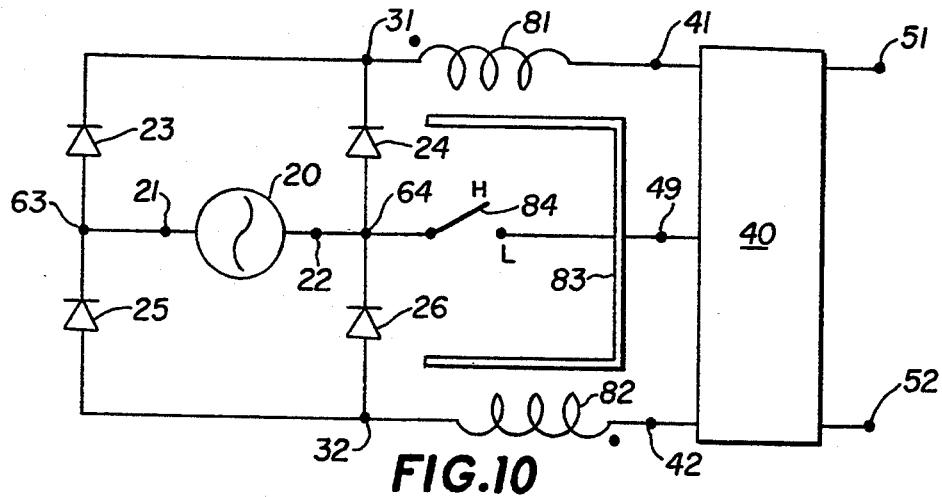
FIG. 10 is a schematic of an embodiment of the present invention using inductors with a common magnetic core wherein the inductors carry direct current.

FIG. 10 shows a configuration wherein inductors 81 and 82 on a common magnetic core 83 carry current in only one direction. Input terminals 21 and 22 are connected directly to bridge rectifier terminals 63 and 64. Inductor 81 is connected between bridge rectifier output terminal 31 and output circuit terminal 41 and inductor 82 is connected between terminal 32 and terminal 42. The inductor windings are oriented such that current from terminal 31 to terminal 41 and current from terminal 42 to terminal 32 have a cumulative effect on the magnetic field in core 83. Switch 84 connects input terminal 22 to output circuit terminal 49 when in the L position.

With switch 84 open, the apparatus is in the high line voltage configuration and, except for the one directional current in the inductors, operation is the same as in FIG. 7.

With switch 84 closed, the apparatus is in the low line voltage configuration. On the positive half cycles, the current path is from terminal 21, through diode 23, inductor 81, output circuit 40, and switch 84, to terminal 22. On the negative half cycles, the current path is from terminal 22, through switch 84, output circuit 40, inductor 82, and diode 25, to terminal 21.

In this version of the apparatus, in the low line voltage configuration, only one of rectifier diodes 23 and 25 and one of inductors 81 and 82 are used each half cycle. However, only one configuration switch 84 is required and, if a permanent magnet is inserted into the magnetic core in a direction such that its field opposes the field produced by the dc current, a substantially smaller core can be used since the entire B-H loop can be used for each half cycle.

Figure 11:
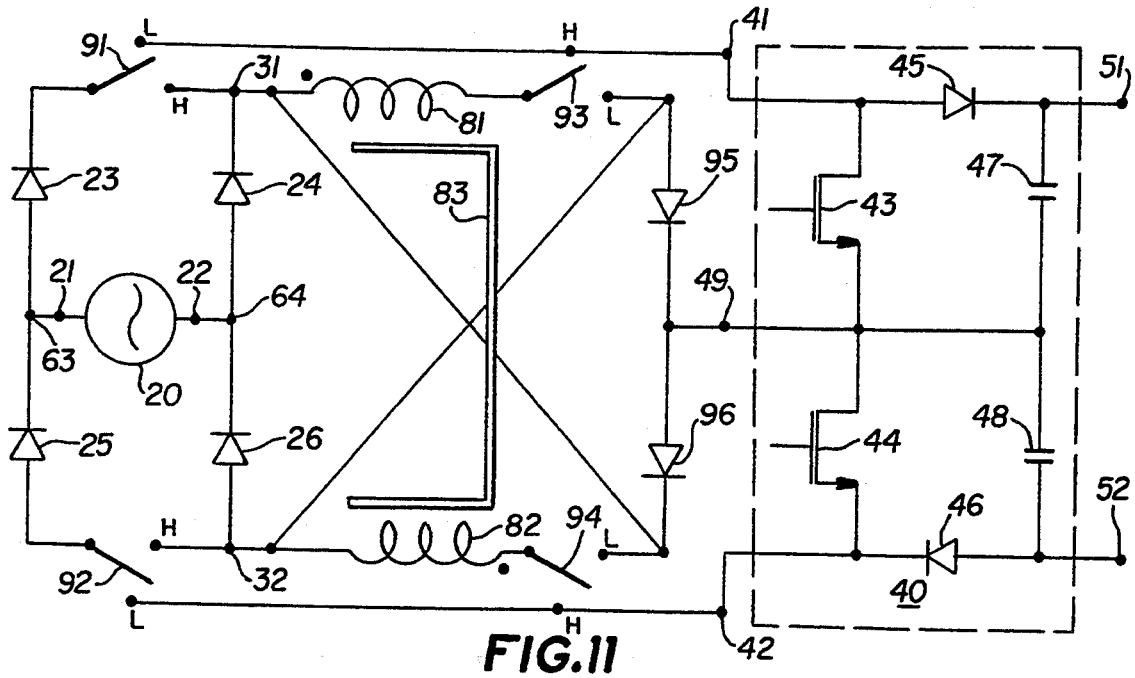
FIG. 11 is a schematic of an embodiment of the present invention using inductors, with a common magnetic core, carrying direct current wherein the inductors are connected in parallel when the rectifier is configured for a low line voltage input.

FIG. 11 shows a configuration functionally similar to FIG. 10 except that the two inductors are connected in parallel when in the low line voltage mode.

In the high line voltage mode, switches 91, 92, 93, and 94 are in the H position and the circuit is functionally identical to that of FIG. 10 when it is in the high line voltage mode.

In the low line voltage mode, switches 91, 92, 93, and 94 are in the L position. Switch 91 breaks the connection between the anodes of diodes 23 and 24 and connects the anode of diode 23 to terminal 41 of the output circuit. Switch 92 breaks the connection between the cathodes of diodes 25 and 26 and connects the cathode of diode 25 to terminal 42 of the output circuit. Switch 93 separates inductor 81 from terminal 41 of the output circuit and connects it to terminal 32. The anode of a diode 95 is permanently connected to terminal 32 and the cathode is permanently connected to terminal 49 of the output circuit. Similarly, switch 94 separates inductor 82 from terminal 42 of the output circuit and connects it to terminal 31. The cathode of a diode 96 is permanently connected to terminal 31 and the anode is permanently connected to terminal 49 of the output circuit.

In low input voltage mode operation, during the positive half-cycle, the current path is from input terminal 21, through diode 23, switch 91, output circuit 40, diode 96, the parallel combination of switch 94 in series with inductor 82 and inductor 81 in series with switch 93, through diode 26 to terminal 22. During the negative half-cycle, the current path is from terminal 22, through diode 24, the parallel combination of inductor 81 in series with switch 93 and switch 94 in series with inductor 82, through diode 95, output circuit 40, switch 92, and diode 25, to terminal 21.

In this configuration, compared to FIG. 10, the advantages of parallel inductors in the low line voltage mode can be realized. However, some additional power is dissipated in diodes 26 and 96 during the positive half cycle and in diodes 24 and 95 during the negative half cycle; all four diodes carry full line current when conducting.

The inventive apparatus described above has many advantages including inductors and rectifier diodes with the same peak current requirement in the low line input configuration as in the high line input configuration even though the line current is doubled in the low line voltage configuration.

Also the transistors and diodes in the output circuit must withstand only (approximately) one-half the output voltage. In the low voltage mode, each transistor only carries one-half the rms current. This permits a reduction in the maximum average power dissipation per transistor to approximately one-sixth that of a single transistor output circuit for the same silicon area per transistor.

The embodiment of FIG. 10 has the advantage that the inductors carry current in only one direction thereby allowing the use of a permanent magnet to oppose the field in the magnetic core produced by the current. Consequently most of the B-H loop of the core is usable on both half cycles of the ac line voltage thereby permitting the use of a smaller magnetic core. Another advantage is that only one switch is required. However, in the low input voltage mode, the inductors and two rectifier diodes must carry the full peak line current on alternate half cycles.

The circuit of FIG. 11 has the advantage of dc current in the inductors as previously described and also, in the low input voltage mode, inductors in parallel sharing the current. In the low line voltage mode, all six rectifier diodes carry peak line current on alternate half cycles, and the inductors each carry one-half the input current on every half cycle.

While the invention has been described above with respect to specific embodiments, it will be understood by those skilled in the art that various changes in form and details may be made therein without departing from the spirit and scope of the invention which receives definition in the following claims.

What is claimed is:

1. High power factor boost rectifier apparatus for providing a dc voltage output from one of a plurality of ac power sources, each of said sources providing one of a plurality of possible voltage levels, comprising:

input circuit means including input terminal means for connecting said boost rectifier apparatus to an ac power source, switching means for configuring said apparatus to the voltage level provided by said ac power source, and rectifier means for supplying rectified ac voltage across first and second rectifier terminals;

an output circuit including first and second intermediate terminals comprising:

semiconductor switch means connected across said first and second intermediate terminals;

first and second diodes;

capacitor means connected in series with said first and second diodes, said first diode connected to said first intermediate terminal and said second diode connected to said second intermediate terminal, thereby placing said semiconductor switch means in parallel with the series-connected first and second diodes and capacitor means;

a first output terminal connected to the junction of said first diode and said capacitor means;

a second output terminal connected to the junction of said second diode and said capacitor means;

said semiconductor switch means includes first and second transistors connected in series;

said capacitor means includes first and second capacitors connected in series; and a connection from the junction of said first and second transistors to the junction of said first and second capacitors;

a first connection from the first rectifier terminal to the first intermediate terminal; and a second connection from the second rectifier terminal to the second intermediate terminal;

whereby a dc output voltage is developed across said first and second output terminals and said output voltage is divided between said first and second transistors, between said first and second diodes, and between said first and second capacitors.

2. The apparatus of claim 1 wherein said input circuit further includes inductance means.

3. The apparatus of claim 2 wherein said inductance means includes first and second inductors.

4. The apparatus of claim 3 wherein said rectifier means comprises a full wave bridge rectifier configuration, its output connected to said first and second rectifier terminals.

5. The apparatus of claim 4 wherein said switching means configures said apparatus for connection to a high level input voltage by connecting said input circuit means and said first and second inductors in series across the input to the full wave bridge rectifier;

whereby said apparatus acts to place rectified positive and negative half cycles across said first and second transistors thereby providing an unboosted and unloaded output voltage equal to the peak ac input voltage.

6. The apparatus of claim 4 wherein said switching means configures said apparatus for connection to a low level input by connecting first and second inductors together in parallel, and by connecting the parallel inductors in series with said input terminal means, and by further connecting that combination of inductors and input terminal means between one input to said full wave rectifier and the junction of said first and second transistors;

whereby said apparatus acts to place a rectified positive half cycle across said first transistor and a rectified negative half cycle across said second transistor thereby providing an unboosted and unloaded output voltage equal to double the peak ac input voltage.

7. The apparatus of claim 4 wherein said switching means configures said apparatus for connection to a low level input by connecting first and second inductors in series across the input to said full wave rectifier, and by connecting said input terminal means between the junction of said first and second inductors and the junction of said first and second transistors;

whereby said apparatus acts to place a rectified positive half cycle across said first transistor and a rectified negative half cycle across said second transistor thereby providing an unboosted and unloaded output voltage equal to double the peak ac input voltage.

8. The apparatus of claim 5 wherein said first and second inductors comprise two windings on a common magnetic core, said windings connected in a cumulative series connection.

9. The apparatus of claim 6 wherein said first and second inductors comprise two windings on a common magnetic core, said windings connected in a cumulative parallel connection.

10. The apparatus of claim 7 wherein said first and second inductors comprise two windings on a common magnetic core, said windings connected in a cumulative parallel connection.

11. The apparatus of claim 4 wherein said first connection includes said first inductor and said second connection includes said second inductor, said first and second inductors comprising two windings on a common magnetic core in a cumulative series connection, and wherein said input terminal means is connected to the input of said full wave bridge rectifier.

12. The apparatus of claim 11 wherein said switching means configures said apparatus for connection to a low level input by connecting one input terminal of said full wave bridge rectifier to the junction of said first and second transistors.

13. The apparatus of claim 11 wherein said common magnetic core includes a permanent magnet, said permanent magnet acting to oppose the magnetic field produced by the dc current in said windings.

14. The apparatus of claim 12 wherein said common magnetic core includes a permanent magnet, said permanent magnet acting to oppose the magnetic field produced by the dc current in said windings.

15. The apparatus of claim 3 wherein said rectifier means includes a full wave bridge rectifier circuit and wherein said switching means configures said apparatus for connection to a low level input voltage, including connecting said first and second inductors in parallel with each other and across the output of said bridge rectifier, said bridge rectifier connected in series between a first terminal of said input terminal means and the junction of said first and second transistors, and wherein said rectifier means includes two rectifier diodes connected in series between said first and second rectifier terminals, the junction of the two series-connected rectifier diodes connected to a second terminal of said input terminal means.

16. The apparatus of claim 15 wherein said first and second inductors comprise two windings on a common magnetic core in a cumulative parallel connection.

17. The apparatus of claim 16 wherein said common magnetic core includes a permanent magnet, said permanent magnet acting to oppose the magnetic field produced by the dc current in said windings.

* * * * *